US011010909B1

United States Patent
Xie et al.

(10) Patent No.: US 11,010,909 B1
(45) Date of Patent: May 18, 2021

(54) ROAD SURFACE INFORMATION-BASED IMAGING ENVIRONMENT EVALUATION METHOD, DEVICE AND SYSTEM, AND STORAGE MEDIUM

(71) Applicant: Beijing Smarter Eye Technology Co. Ltd., Beijing (CN)

(72) Inventors: Qiwei Xie, Beijing (CN); Zhao Sun, Beijing (CN); Yongcai Liu, Beijing (CN); Feng Cui, Beijing (CN); Haitao Zhu, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 24 days.

(21) Appl. No.: 16/721,107

(22) Filed: Dec. 19, 2019

(30) Foreign Application Priority Data

Nov. 15, 2019 (CN) .......................... 201911118254.2

(51) Int. Cl.
  *G06K 9/00* (2006.01)
  *G06T 7/536* (2017.01)
(52) U.S. Cl.
  CPC .......... *G06T 7/536* (2017.01); *G06K 9/00624* (2013.01)
(58) Field of Classification Search
  None
  See application file for complete search history.

(56) References Cited

U.S. PATENT DOCUMENTS

| 2004/0264763 | A1* | 12/2004 | Mas | G06K 9/00664 382/154 |
| 2009/0041337 | A1* | 2/2009 | Nakano | G06K 9/00798 382/154 |
| 2010/0246896 | A1* | 9/2010 | Saito | G06K 9/00798 382/106 |
| 2013/0148856 | A1* | 6/2013 | Lu | G06K 9/00798 382/104 |
| 2014/0161323 | A1* | 6/2014 | Livyatan | G06T 3/0093 382/107 |
| 2019/0279386 | A1* | 9/2019 | Motohashi | H04N 13/204 |
| 2020/0183411 | A1* | 6/2020 | Oba | B60W 30/165 |

* cited by examiner

*Primary Examiner* — Shervin K Nakhjavan
(74) *Attorney, Agent, or Firm* — Novick, Kim & Lee, PLLC; Allen Xue

(57) ABSTRACT

Provided is a road surface information-based imaging environment evaluation method, an imaging environment evaluation device, an imaging environment evaluation system, and a storage medium. The imaging environment evaluation method includes: acquiring a disparity information matrix and pixel coordinates of a vanishing point in the disparity information matrix; subjecting the disparity information matrix to matrix partition and projection in accordance with the pixel coordinates of the vanishing point so as to acquire a disparity projection image; acquiring a road surface model-based statistic model in accordance with the disparity projection image; and acquiring an evaluation result of a current imaging environment in accordance with a relationship between the statistic model and a predetermined threshold.

18 Claims, 1 Drawing Sheet

ROAD SURFACE INFORMATION-BASED IMAGING ENVIRONMENT EVALUATION METHOD, DEVICE AND SYSTEM, AND STORAGE MEDIUM

TECHNICAL FIELD

The present disclosure relates to the field of binocular camera imaging technology, in particular to a road surface information-based imaging environment evaluation method, a road surface information-based imaging environment evaluation device, a road surface information-based imaging environment evaluation system, and a storage medium.

BACKGROUND

Along with the development of the sensor technology and the machine vision technology, binocular cameras have been widely applied to robots and intelligent vehicles. A binocular visual system is a visual detection system based on a binocular imaging principle, so its performance depends on imaging quality. The imaging quality of a visual sensor is restricted by various factors, and an imaging environment is one of the important factors. The so-called imaging environment mainly refers to an environmental brightness value when an image is captured by the visual sensor. An operating principle of the visual sensor just lies in photovoltaic conversion, i.e., a received optical signal is converted into an electric signal and then the electric signal is outputted. When images are captured in a same scene, the imaging quality is absolutely affected due to different brightness values. Typically, the brightness value in the scene may be measured through such a device as illuminometer. However, it is unable to monitor the brightness value on line and in real time, so it is impossible to meet the requirements in the automatic driving field.

SUMMARY

An object of the present disclosure is to provide a road surface information-based imaging environment evaluation method, a road surface information-based imaging environment evaluation device, a road surface information-based imaging environment evaluation system, and a storage medium, so as to at least partially solve the problem in the related art where it is impossible to evaluate an imaging environment in time when it is difficult to detect a brightness value in the imaging environment.

In one aspect, the present disclosure provides in some embodiments a road surface information-based imaging environment evaluation method, including: acquiring a disparity information matrix and pixel coordinates of a vanishing point in the disparity information matrix; subjecting the disparity information matrix to matrix partition and projection in accordance with the pixel coordinates of the vanishing point so as to acquire a disparity projection image; acquiring a road surface model-based statistic model in accordance with the disparity projection image; and acquiring an evaluation result of a current imaging environment in accordance with a relationship between the statistic model and a predetermined threshold.

In a possible embodiment of the present disclosure, the subjecting the disparity information matrix to matrix partition and projection in accordance with the pixel coordinates of the vanishing point so as to acquire the disparity projection image includes: subjecting the disparity information matrix to matrix partition in accordance with the pixel coordinates of the vanishing point so as to acquire a partitioned disparity matrix; and subjecting the partitioned disparity matrix to projection in a column direction so as to acquire the disparity projection image.

In a possible embodiment of the present disclosure, the subjecting the disparity information matrix to matrix partition in accordance with the pixel coordinates of the vanishing point so as to acquire the partitioned disparity matrix includes: setting the pixel coordinates of the vanishing point as vp=(xv, yv), and setting the disparity information matrix as a two-dimensional matrix including m rows and n columns with serial numbers of the rows being arranged in an ascending order from top to bottom and serial numbers of the columns being arranged in an ascending order from left to right; and storing all information about a disparity matrix from a $(yv)^{th}$ row to an $m^{th}$ row to acquire the partitioned disparity matrix, the partitioned disparity matrix being a two-dimensional matrix including t rows and n columns, where t=m−yv.

In a possible embodiment of the present disclosure, the acquiring the road surface model-based statistic model in accordance with the disparity projection image includes: fitting a road surface model in accordance with the disparity projection image; and subjecting the road surface model to projection in a direction perpendicular to the road surface model so as to acquire the statistic model.

In a possible embodiment of the present disclosure, the acquiring the evaluation result of the current imaging environment in accordance with the relationship between the statistic model and the predetermined threshold includes: subjecting the statistic model to Gaussian fitting so as to acquire a variance of the statistic model; when the variance of the statistic model is smaller than the predetermined threshold, determining that the evaluation result of the current imaging environment is good; and when the variance of the statistic model is greater than the predetermined threshold, determining that the evaluation result of the current imaging environment is not good.

In another aspect, the present disclosure provides in some embodiments an imaging environment evaluation device, including: a disparity matrix acquisition unit configured to acquire a disparity information matrix and pixel coordinates of a vanishing point in the disparity information matrix; a disparity projection image acquisition unit configured to subject the disparity information matrix to matrix partition and projection in accordance with the pixel coordinates of the vanishing point so as to acquire a disparity projection image; a statistic model acquisition unit configured to acquire a road surface model-based statistic model in accordance with the disparity projection image; and an evaluation unit configured to acquire an evaluation result of a current imaging environment in accordance with a relationship between the statistic model and a predetermined threshold.

In a possible embodiment of the present disclosure, the disparity projection image acquisition unit is further configured to: subject the disparity information matrix to matrix partition in accordance with the pixel coordinates of the vanishing point so as to acquire a partitioned disparity matrix; and subject the partitioned disparity matrix to projection in a column direction so as to acquire the disparity projection image.

In a possible embodiment of the present disclosure, the disparity projection image acquisition unit is further configured to: set the pixel coordinates of the vanishing point as vp=(xv, yv), and set the disparity information matrix as a two-dimensional matrix including m rows and n columns with serial numbers of the rows being arranged in an ascending order from top to bottom and serial numbers of the columns being arranged in an ascending order from left to right; and store all information about a disparity matrix from a $(yv)^{th}$ row to an $m^{th}$ row to acquire the partitioned disparity matrix, the partitioned disparity matrix being a two-dimensional matrix including t rows and n columns, where t=m−yv.

In yet another aspect, the present disclosure provides in some embodiments an imaging environment evaluation system, including a processor and a memory. The memory is configured to store therein one or more program instructions. The processor is configured to execute the one or more program instructions so as to implement the above-mentioned imaging environment evaluation method.

In still yet another aspect, the present disclosure provides in some embodiments a computer-readable storage medium storing therein one or more program instructions. The one or more program instructions are executed by an imaging environment evaluation system so as to implement the above-mentioned imaging environment evaluation method.

According to the road surface information-based imaging environment evaluation method, the road surface information-based imaging environment evaluation device, the road surface information-based imaging environment evaluation system, and the storage medium in the embodiments of the present disclosure, the disparity information matrix and the pixel coordinates of the vanishing point in the disparity information matrix may be acquired. Then, the disparity information matrix may be subjected to matrix partition and projection in accordance with the pixel coordinates of the vanishing point, so as to acquire the disparity projection image. Then, the road surface model-based statistic model may be acquired in accordance with the disparity projection image, and the evaluation result of the current imaging environment may be acquired in accordance with the relationship between the statistic model and the predetermined threshold. Through evaluating the current imaging environment in accordance with a statistic feature of the disparity information acquired by a binocular system, it is able to detect the imaging environment on line and in real time, improve the detection timeliness and accuracy of the imaging environment, and especially meet the requirement in the automatic driving field, thereby to solve the problem in the related art where it is impossible to evaluate the imaging environment when it is difficult to detect a brightness value in the imaging environment.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

REFERENCE SIGN LIST

100 disparity matrix acquisition unit
200 disparity projection image acquisition unit
300 statistic model acquisition unit
400 evaluation unit

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
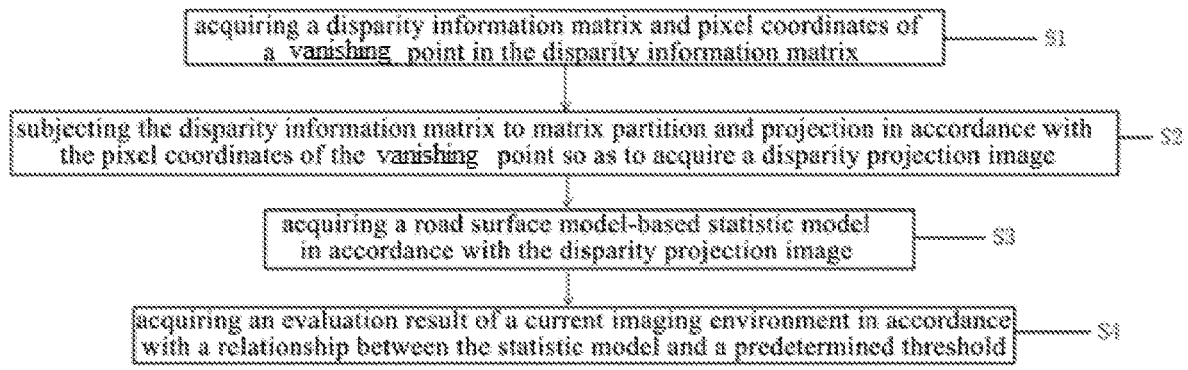
FIG. 1 is a flow chart of an imaging environment evaluation method according to one embodiment of the present disclosure.

The present disclosure provides in some embodiments a road surface information-based imaging environment evaluation method, so as to accurately evaluate a current imaging environment in real time in accordance with a statistic feature of disparity information acquired by a binocular system. As shown in FIG. 1, the imaging environment evaluation method may include the following steps.

S1: acquiring a disparity information matrix and pixel coordinates of a vanishing point in the disparity information matrix.

To be specific, the disparity information matrix may be disparity information disp acquired by a binocular visual system in the current imaging environment. The disparity information may be acquired through calculating a left-eye image and a right-eye image acquired by a binocular camera of the binocular visual system through a stereo matching algorithm. Physically, the disparity information disp may be a difference between coordinates of each pixel point in the left-eye image and coordinates of a unique pixel point in the right-eye image corresponding to the pixel in the left-eye image. The disparity information is described with respect to each pixel point in the left-eye image, so it may be considered as a matrix having an identical size to the left-eye image in terms of pixels, i.e., the disparity information matrix.

The pixel coordinates of the vanishing point may be set as vp. The vanishing point may depend on an assembling position of the binocular camera. When assembling the binocular camera, a pitch angle of the binocular camera may be adjusted in such a manner that the vanishing point is located in proximity to a center of the image as possible.

S2: subjecting the disparity information matrix to matrix partition and projection in accordance with the pixel coordinates of each vanishing point so as to acquire a disparity projection image.

To be specific, the subjecting the disparity information matrix to matrix partition and projection in accordance with the pixel coordinates of the vanishing point so as to acquire the disparity projection image may include the following steps.

At first, the disparity information matrix may be subjected to matrix partition in accordance with the pixel coordinates of the vanishing point so as to acquire a partitioned disparity matrix. To be specific, the pixel coordinates of the vanishing point may be set as vp=(xv, yv), and the disparity information matrix may be set as a two-dimensional matrix including m rows and n columns, with serial numbers of the rows being arranged in an ascending order from top to bottom and serial numbers of the columns being arranged in an ascending order from left to right. Then, all information about a disparity matrix from a $(yv)^{th}$ row to an $m^{th}$ row may be stored to acquire the partitioned disparity matrix, and the partitioned disparity matrix may be a two-dimensional matrix including t rows and n columns, where t=m−yv.

In actual use, the pixel coordinates of the vanishing point may set as vp=(xv, yv), i.e., the vanishing point may be located in the $(yv)^{th}$ row and an $(xv)^{th}$ column in the image. The disparity information matrix disp may have an identical size to the image, i.e., a two-dimensional matrix having m rows and n columns, with the serial numbers of the rows being arranged in an ascending order from top to bottom and the serial numbers of the columns being arranged in an ascending order from left to right. When subjecting the disparity information matrix to matrix partition, merely the information about the disparity matrix from the $(yv)^{th}$ row to the $m^{th}$ row may be stored, i.e., the partitioned disparity matrix disp' may be a two-dimensional matrix having t rows and n columns, where t=m−yv.

Then, the partitioned disparity matrix disp' may be subjected to projection in a column direction so as to acquire the disparity projection image v-disp. The acquired disparity projection image v-disp may be a two-dimensional matrix having t rows and s columns. Rows of v-disp may correspond to rows of disp' respectively, and the s columns may be used to represent the quantity of disparity values in disp'. For example, when a value in an $i^{th}$ row and a $j^{th}$ column of v-disp is d, it means that there are d elements each having a disparity value of j in an $i^{th}$ row of disp'.

S3: acquiring a road surface model-based statistic model in accordance with the disparity projection image.

To be specific, a road surface model may be fitted in accordance with the disparity projection image, and then the road surface model may be subjected to projection in a direction perpendicular to the road surface model so as to acquire the statistic model. The road surface model R acquired in accordance with v-disp may be represented by a linear equation d(p)=kp+b, where p represents an pth row of v-disp, and d(p) represents a disparity value in the pth row of the image with respect to a road surface meeting the road surface model R. Slope k and a distance b may be parameters to be acquired for fitting the road surface model.

S4: acquiring an evaluation result of the current imaging environment in accordance with a relationship between the statistic model and a predetermined threshold.

To be specific, S4 may include: subjecting the statistic model to Gaussian fitting so as to acquire a variance of the statistic model; when the variance of the statistic model is smaller than the predetermined threshold, determining that the evaluation result of the current imaging environment is good; and when the variance of the statistic model is greater than the predetermined threshold, determining that the evaluation result of the current imaging environment is not good.

In actual use, the road surface model may be subjected to projection in the direction perpendicular to the road surface model R, so as to acquire the statistic model S. Then, v-disp may be subjected to projection in the direction perpendicular to the road surface model R, and all elements in v-disp in a same projection direction may be added to acquire the statistic model S. Physically, the statistic model S may be a statistic model representing a disparity value corresponding to each pixel of the road surface in v-disp.

During the model analysis, many experiments show that, the statistic model S is a function approximate to Gaussian distribution, so the statistic model may be subjected to Gaussian fitting, so as to acquire an average ave and a variance std of the statistic model. In a good imaging environment, i.e., in an imaging environment with enough light, the binocular system may generate high-quality depth information, and at this time the variance of the statistic model S may be very small. In an imaging environment with insufficient light, the variance of the statistic model S acquired in accordance with the depth information generated by the binocular system may be greater, In this regard, many experiments show that the variances of the statistic models S acquired in accordance with the depth information may gradually increase when the imaging environment becomes darker and darker. Hence, the variance std of the statistic model S, as a feature evaluation index, may be compared with the predetermined threshold TH acquired through the experiments, so as to appropriately evaluate the imaging environment.

According to the road surface information-based imaging environment evaluation method in the embodiments of the present disclosure, the disparity information matrix and the pixel coordinates of the vanishing point in the disparity information matrix may be acquired, the disparity information matrix may be subjected to matrix partition and projection in accordance with the pixel coordinates of the vanishing point so as to acquire the disparity projection image, the road surface model-based statistic model may be acquired in accordance with the disparity projection image, and then the evaluation result of the current imaging environment may be acquired in accordance with the relationship between the statistic model and the predetermined threshold. Through evaluating the current imaging environment in accordance with a statistic feature of the disparity information acquired by a binocular system, it is able to detect the imaging environment on line and in real time, improve the detection timeliness and accuracy of the imaging environment, and especially meet the requirement in the automatic driving field, thereby to solve the problem in the related art where it is impossible to evaluate the imaging environment when it is difficult to detect a brightness value in the imaging environment.

Figure 2:
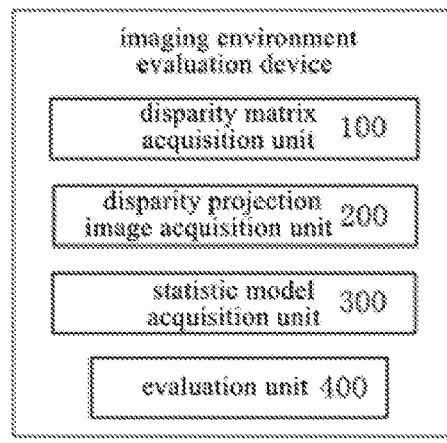
FIG. 2 is a block diagram of an imaging environment evaluation device according to one embodiment of the present disclosure.

The present disclosure further provides in some embodiments an imaging environment evaluation device capable of implementing the above-mentioned imaging environment evaluation method. As shown in FIG. 2, the imaging environment evaluation device includes a disparity matrix acquisition unit 100, a disparity projection image acquisition unit 200, a statistic model acquisition unit 300, and an evaluation unit 400.

The disparity matrix acquisition unit 100 is configured to acquire a disparity information matrix and pixel coordinates of a vanishing point in the disparity information matrix. To be specific, the disparity information matrix may be disparity information disp acquired by a binocular visual system in the current imaging environment. The disparity information may be acquired through calculating a left-eye image and a right-eye image acquired by a binocular camera of the binocular visual system through a stereo matching algorithm. Physically, the disparity information disp may be a difference between coordinates of each pixel point in the left-eye image and coordinates of a unique pixel point in the right-eye image corresponding to the pixel in the left-eye image. The disparity information is described with respect to each pixel point in the left-eye image, so it may be considered as a matrix having an identical size to the left-eye image in terms of pixels, i.e., the disparity information matrix.

The pixel coordinates of the vanishing point may be set as vp. The vanishing point may depend on an assembling position of the binocular camera. When assembling the binocular camera, a pitch angle of the binocular camera may be adjusted in such a manner that the vanishing point is located in proximity to a center of the image as possible.

The disparity projection image acquisition unit 200 is configured to subject the disparity information matrix to matrix partition and projection in accordance with the pixel coordinates of the vanishing point so as to acquire a disparity projection image. To be specific, the disparity projection image acquisition unit 200 is configured to subject the disparity information matrix to matrix partition in accordance with the pixel coordinates of the vanishing point so as to acquire a partitioned disparity matrix. To be specific, the pixel coordinates of the vanishing point may be set as vp=(xv, yv), and the disparity information matrix may be set as a two-dimensional matrix including m rows and n columns, with serial numbers of the rows being arranged in an ascending order from top to bottom and serial numbers of the columns being arranged in an ascending order from left to right. Then, all information about a disparity matrix from a $(yv)^{th}$ row to an $m^{th}$ row may be stored to acquire the partitioned disparity matrix, and the partitioned disparity matrix may be a two-dimensional matrix including t rows and n columns, where t=m−yv.

In actual use, the pixel coordinates of the vanishing point may set as vp=(xv, yv), i.e., the vanishing point may be located in the $(yv)^{th}$ row and an $(xv)^{th}$ column in the image. The disparity information matrix disp may have an identical size to the image, i.e., a two-dimensional matrix having m rows and n columns, with the serial numbers of the rows being arranged in an ascending order from top to bottom and the serial numbers of the columns being arranged in an ascending order from left to right. When subjecting the disparity information matrix to matrix partition, merely the information about the disparity matrix from the $(yv)^{th}$ row to the $m^{th}$ row may be stored, i.e., the partitioned disparity matrix disp' may be a two-dimensional matrix having t rows and n columns, where t=m−yv.

Then, the disparity projection image acquisition unit 200 is configured to subject the partitioned disparity matrix disp' to projection in a column direction so as to acquire the disparity projection image v-disp. The acquired disparity projection image v-disp may be a two-dimensional matrix having t rows and s columns. Rows of v-disp may correspond to rows of disp' respectively, and the s columns may be used to represent the quantity of disparity values in disp'. For example, when a value in an $i^{th}$ row and a $j^{th}$ column of v-disp is d, it means that there are d elements each having a disparity value of j in an $i^{th}$ row of disp'.

The statistic model acquisition unit 300 is configured to acquire a road surface model-based statistic model in accordance with the disparity projection image. To be specific, the statistic model acquisition unit 300 is configured to fit a road surface model in accordance with the disparity projection image, and then subject the road surface model to projection in a direction perpendicular to the road surface model so as to acquire the statistic model. The road surface model R acquired in accordance with v-disp may be represented by a linear equation d(p)=kp+b, where p represents an pth row of v-disp, and d(p) represents a disparity value in the pth row of the image with respect to a road surface meeting the road surface model R. Slope k and a distance b may be parameters to be acquired for fitting the road surface model.

The evaluation unit 400 is configured to acquire an evaluation result of a current imaging environment in accordance with a relationship between the statistic model and a predetermined threshold. To be specific, the evaluation unit 400 is further configured to: subject the statistic model to Gaussian fitting so as to acquire a variance of the statistic model; when the variance of the statistic model is smaller than the predetermined threshold, determine that the evaluation result of the current imaging environment is good; and when the variance of the statistic model is greater than the predetermined threshold, determine that the evaluation result of the current imaging environment is not good.

In actual use, the road surface model may be subjected to projection in the direction perpendicular to the road surface model R, so as to acquire the statistic model S. Then, v-disp may be subjected to projection in the direction perpendicular to the road surface model R, and all elements in v-disp in a same projection direction may be added to acquire the statistic model S. Physically, the statistic model S may be a statistic model representing a disparity value corresponding to each pixel of the road surface in v-disp.

During the model analysis, many experiments show that, the statistic model S is a function approximate to Gaussian distribution, so the statistic model may be subjected to Gaussian fitting, so as to acquire an average ave and a variance std of the statistic model. In a good imaging environment, i.e., in an imaging environment with enough light, the binocular system may generate high-quality depth information, and at this time the variance of the statistic model S may be very small. In an imaging environment with insufficient light, the variance of the statistic model S acquired in accordance with the depth information generated by the binocular system may be greater.

In this regard, many experiments show that the variances of the statistic models S acquired in accordance with the depth information may gradually increase when the imaging environment becomes darker and darker. Hence, the variance std of the statistic model S, as a feature evaluation index, may be compared with the predetermined threshold TH acquired through the experiments, so as to appropriately evaluate the imaging environment.

According to the road surface information-based imaging environment evaluation device in the embodiments of the present disclosure, the disparity information matrix and the pixel coordinates of the vanishing point in the disparity information matrix may be acquired, the disparity information matrix may be subjected to matrix partition and projection in accordance with the pixel coordinates of the vanishing point so as to acquire the disparity projection image, the road surface model-based statistic model may be acquired in accordance with the disparity projection image, and then the evaluation result of the current imaging environment may be acquired in accordance with the relationship between the statistic model and the predetermined threshold. Through evaluating the current imaging environment in accordance with a statistic feature of the disparity information acquired by a binocular system, it is able to detect the imaging environment on line and in real time, improve the detection timeliness and accuracy of the imaging environment, and especially meet the requirement in the automatic driving field, thereby to solve the problem in the related art where it is impossible to evaluate the imaging environment when it is difficult to detect a brightness value in the imaging environment.

Figure 3:
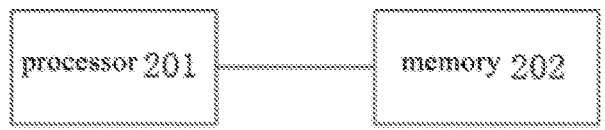
FIG. 3 is a block diagram of an imaging environment evaluation system according to one embodiment of the present disclosure.

The present disclosure further provides in some embodiments an imaging environment evaluation system which, as shown in FIG. 3, includes a processor 201 and a memory 202. The memory is configured to store therein one or more program instructions. The processor is configured to execute the one or more program instructions so as to implement the above-mentioned imaging environment evaluation method.

Correspondingly, the present disclosure further provides in some embodiments a computer-readable storage medium storing therein one or more program instructions. The one or more program instructions may be executed by an imaging environment evaluation system so as to implement the above-mentioned imaging environment evaluation method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A road surface information-based imaging environment evaluation method, comprising:
   acquiring a disparity information matrix and pixel coordinates of a vanishing point in the disparity information matrix;
   subjecting the disparity information matrix to matrix partition and projection in accordance with the pixel coordinates of the vanishing point so as to acquire a disparity projection image;
   acquiring a road surface model-based statistic model in accordance with the disparity projection image; and
   acquiring an evaluation result of a current imaging environment in accordance with a relationship between the statistic model and a predetermined threshold.

2. The imaging environment evaluation method according to claim 1, wherein the subjecting the disparity information matrix to matrix partition and projection in accordance with the pixel coordinates of the vanishing point so as to acquire the disparity projection image comprises:
   subjecting the disparity information matrix to matrix partition in accordance with the pixel coordinates of the vanishing point so as to acquire a partitioned disparity matrix; and
   subjecting the partitioned disparity matrix to projection in a column direction so as to acquire the disparity projection image.

3. The imaging environment evaluation method according to claim 2, wherein the subjecting the disparity information matrix to matrix partition in accordance with the pixel coordinates of the vanishing point so as to acquire the partitioned disparity matrix comprises:
   setting the pixel coordinates of the vanishing point as vp=(xv, yv), and setting the disparity information matrix as a two-dimensional matrix comprising m rows and n columns with serial numbers of the rows being arranged in an ascending order from top to bottom and serial numbers of the columns being arranged in an ascending order from left to right; and
   storing all information about a disparity matrix from a $(yv)^{th}$ row to an $m^{th}$ row to acquire the partitioned disparity matrix, the partitioned disparity matrix being a two-dimensional matrix comprising t rows and n columns, where t=m−yv.

4. The imaging environment evaluation method according to claim 3, wherein the acquiring the road surface model-based statistic model in accordance with the disparity projection image comprises:
   fitting a road surface model in accordance with the disparity projection image; and
   subjecting the road surface model to projection in a direction perpendicular to the road surface model so as to acquire the statistic model.

5. The imaging environment evaluation method according to claim 4, wherein the acquiring the evaluation result of the current imaging environment in accordance with the relationship between the statistic model and the predetermined threshold comprises:
   subjecting the statistic model to Gaussian fitting so as to acquire a variance of the statistic model;

when the variance of the statistic model is smaller than the predetermined threshold, determining that the evaluation result of the current imaging environment is good; and when the variance of the statistic model is greater than the predetermined threshold, determining that the evaluation result of the current imaging environment is not good.

6. An imaging environment evaluation system, comprising a processor and a memory, wherein the memory is configured to store therein one or more program instructions, and the processor is configured to execute the one or more program instructions so as to implement the imaging environment evaluation method according to claim 5.

7. A non-transitory computer-readable storage medium storing therein one or more program instructions, wherein the one or more program instructions is executed by an imaging environment evaluation system so as to implement the imaging environment evaluation method according to claim 5.

8. An imaging environment evaluation system, comprising a processor and a memory, wherein the memory is configured to store therein one or more program instructions, and the processor is configured to execute the one or more program instructions so as to implement the imaging environment evaluation method according to claim 4.

9. A non-transitory computer-readable storage medium storing therein one or more program instructions, wherein the one or more program instructions is executed by an imaging environment evaluation system so as to implement the imaging environment evaluation method according to claim 4.

10. An imaging environment evaluation system, comprising a processor and a memory, wherein the memory is configured to store therein one or more program instructions, and the processor is configured to execute the one or more program instructions so as to implement the imaging environment evaluation method according to claim 3.

11. A non-transitory computer-readable storage medium storing therein one or more program instructions, wherein the one or more program instructions is executed by an imaging environment evaluation system so as to implement the imaging environment evaluation method according to claim 1.

12. An imaging environment evaluation system, comprising a processor and a memory, wherein the memory is configured to store therein one or more program instructions, and the processor is configured to execute the one or more program instructions so as to implement the imaging environment evaluation method according to claim 2.

13. A non-transitory computer-readable storage medium storing therein one or more program instructions, wherein the one or more program instructions is executed by an imaging environment evaluation system so as to implement the imaging environment evaluation method according to claim 2.

14. An imaging environment evaluation system, comprising a processor and a memory, wherein the memory is configured to store therein one or more program instructions, and the processor is configured to execute the one or more program instructions so as to implement the imaging environment evaluation method according to claim 1.

15. A non-transitory computer-readable storage medium storing therein one or more program instructions, wherein the one or more program instructions is executed by an imaging environment evaluation system so as to implement the imaging environment evaluation method according to claim 1.

16. An imaging environment evaluation device, comprising:
a disparity matrix acquisition unit configured to acquire a disparity information matrix and pixel coordinates of a vanishing point in the disparity information matrix;
a disparity projection image acquisition unit configured to subject the disparity information matrix to matrix partition and projection in accordance with the pixel coordinates of the vanishing point so as to acquire a disparity projection image;
a statistic model acquisition unit configured to acquire a road surface model-based statistic model in accordance with the disparity projection image; and
an evaluation unit configured to acquire an evaluation result of a current imaging environment in accordance with a relationship between the statistic model and a predetermined threshold.

17. The imaging environment evaluation device according to claim 16, wherein the disparity projection image acquisition unit is further configured to:
subject the disparity information matrix to matrix partition in accordance with the pixel coordinates of the vanishing point so as to acquire a partitioned disparity matrix; and
subject the partitioned disparity matrix to projection in a column direction so as to acquire the disparity projection image.

18. The imaging environment evaluation device according to claim 17, wherein the disparity projection image acquisition unit is further configured to:
set the pixel coordinates of the vanishing point as vp=(xv, yv), and set the disparity information matrix as a two-dimensional matrix comprising m rows and n columns with serial numbers of the rows being arranged in an ascending order from top to bottom and serial numbers of the columns being arranged in an ascending order from left to right; and
store all information about a disparity matrix from a $(yv)^{th}$ row to an $m^{th}$ row to acquire the partitioned disparity matrix, the partitioned disparity matrix being a two-dimensional matrix comprising t rows and n columns, where t=m−yv.

* * * * *